United States Patent Office 3,035,893
Patented May 22, 1962

---

3,035,893
PREPARATION OF SULPHUR HALOGEN COMPOUND
Hugh Leithead Roberts, Northwich, England, assignor to Imperial Chemical Industries Limited, London, England, a corporation of Great Britain
No Drawing. Filed Dec. 21, 1959, Ser. No. 860,700
Claims priority, application Great Britain Jan. 23, 1959
5 Claims. (Cl. 23—14)

This invention relates to sulphur halogen compounds, particularly to sulphur pentafluoride monochloride and to a new method of making it.

In British applictain 31,320/58 we have disclosed the new compound sulphur pentafluoride monochloride and a method of making it by reacting sulphur monochloride or dichloride with fluorine at a low temperature and separating sulphur pentafluoride monochloride from the reaction products.

One logical way from a stoichiometric point of view of making sulphur pentafluoride monochloride, hereinafter called sulphur chloride pentafluoride, would be to combine chlorine monofluoride with sulphur tetrafluoride. We first found that by reacting chlorine trifluoride with sulphur tetrafluoride it is possible to obtain sulphur chloride pentafluoride and sulphur hexafluoride. This may come about by chlorine trifluoride reacting as such, but it is not unlikely to be due to it reacting as a mixture of chlorine monofluoride and fluoride produced from it by dissociation. It is considered that as produced in such a dissociation process chlorine monofluoride is in an excited state which encourages its reaction with sulphur tetrafluoride. Chlorine trifluoride is known to react almost instantaneously with chlorine at elevated temperatures to give chlorine monofluoride, and we next found that chlorine monofluoride produced in this way can react with sulphur tetrafluoride to give sulphur chloride pentafluoride in almost quantitative yield.

According to our invention we prepare sulphur chloride pentafluoride by reacting sulphur tetrafluoride with chlorine trifluoride or with chlorine monofluoride, the latter being produced for example by dissociation of chlorine trifluoride or by reacting chlorine with chlorine trifluoride.

The reactions can be carried out at room temperature, but are then slow and elevated temperatures, for example 100–350° C., are preferable. Copper reaction vessels may be used up to 200° C. but for higher temperatures copper is best replaced by nickel or stainless steel. They may also be carried out in the liquid phase below 0° C.; in fact, the lower the temperature the more is the reaction equilibrium in favour of the formation of sulphur chloride pentafluoride, but on the other hand the rate of reaction decreases with decreasing temperature. The reactions may be batch or continuous and should be carried out in the absence of moisture.

Normally the reactions are conducted at pressures ranging from atmospheric to about three atmospheres. Higher pressures may be employed if desired.

The reaction with chlorine trifluoride may be represented by the equation $$2SF_4 + ClF_3 = SF_5Cl SF_6$$

but if chlorine trifluoride is sufficiently dissociated under the conditions of reaction in accordance with the equation $$ClF_3 \rightleftharpoons ClF + F_2$$

the course of the reaction is $$SF_4 + ClF = SF_5Cl$$
$$SF_4 + F_2 = SF_6$$

If, on the other hand, chlorine monofluoride is prepared first and then allowed to react with sulphur tetrafluoride, the reaction is represented by the equation $$ClF + SF_4 = SF_5Cl$$

Since this reaction proceeds almost quantitatively with yields of 90% and over it is preferred to the other reaction which necessarily produces sulphur hexafluoride as well.

Sulphur pentafluoride monochloride is useful as a free-radical-producing initiator of polymerisation processes for certain halogenated hydrocarbons. It is also useful for introducing $SF_5$— groups into other molecules.

The following examples illustrate but do not restrict the invention.

*Example 1*

An evacuated stainless steel reaction vessel of approximately 600 mls. capacity was charged under anhydrous conditions with 3.0 g. of chlorine trifluoride and 2.5 g. of chlorine, and the mixture heated to 350° C. for an hour, which is sufficient to bring the reaction $$ClF_3 + Cl_2 = 3ClF$$

substantially to completion. The vessel was cooled to room temperature and 10 g. of sulphur tetrafluoride introduced, after which it was heated to 300° C. for 2 hours. On cooling the reaction products were scrubbed with a solution of ferrous sulphate in 2 N sulphuric acid to remove any excess chlorine, chlorine monofluoride and chlorine trifluoride, and then with a solution of potassium dichromate in 2 N sulphuric acid to remove any sulphur dioxide produced by hydrolysis of sulphur tetrafluoride by traces of moisture in the system. This procedure yielded approximately 13 g. of sulphur chloride pentafluoride identified by boiling point, −21° C., and strong infra-red absorption bands at wave number values of 905 cm.$^{-1}$ and 854 cm.$^{-1}$.

*Example 2*

An evacuated copper reaction vessel of approximately 10 litres capacity is charged under anhydrous conditions with 46 g. of chlorine trifluoride and 106 g. of sulphur tetrafluoride and the mixture heated at 120° C. for several hours. On cooling to room temperature approximately 70 g. of sulphur chloride pentafluoride were separated by gas chromatography from the reaction products, the remainder consisting mainly of sulphur hexafluoride.

What I claim is:

1. Process for making sulphur chloride pentafluoride, $SF_5Cl$, comprising reacting sulphur tetrafluoride with a member of the group consisting of chlorine monofluoride and chlorine trifluoride under substantially anhydrous conditions.

2. Process as claimed in claim 1 in which chlorine monofluoride is produced within the reaction system by dissociation of chlorine trifluoride.

3. Process as claimed in claim 1 when carried out at elevated temperature.

4. Process as claimed in claim 3 in which the reaction temperature is between 100° and 350° C.

5. Process as claimed in claim 1 in which the reaction pressure is greater than one atmosphere.

References Cited in the file of this patent
UNITED STATES PATENTS
2,937,123    Muetterties _____ May 17, 1960

OTHER REFERENCES

Cotton et al.: "Properties of $SF_4$ and Its Adduct with $BF_3$," Journal of Inorganic and Nuclear Chemistry, vol. 7, 1958, pages 397–403.

Clark, Chemical Reviews, vol. 58, No. 5, October 1958, page 883.